(12) United States Patent
DeMiglio et al.

(10) Patent No.: US 12,096,876 B2
(45) Date of Patent: Sep. 24, 2024

(54) BEVERAGE BREWING DEVICE

(71) Applicant: Universal Coffee LLC, La Mirada, CA (US)

(72) Inventors: Ronald R. DeMiglio, Sun City West, AZ (US); Mark J. Staudacher, Anthem, AZ (US); Randall C. Anderson, Brush Prairie, WA (US)

(73) Assignee: Universal Coffee LLC, La Mirada, CA (US)

( * ) Notice: Subject to any disclaimer, the term of this patent is extended or adjusted under 35 U.S.C. 154(b) by 0 days.

(21) Appl. No.: 18/195,903

(22) Filed: May 10, 2023

(65) Prior Publication Data
US 2023/0276975 A1    Sep. 7, 2023

Related U.S. Application Data

(60) Division of application No. 16/835,165, filed on Mar. 30, 2020, now Pat. No. 11,684,198, which is a
(Continued)

(51) Int. Cl.
*A47J 31/06*    (2006.01)
(52) U.S. Cl.
CPC .................. *A47J 31/0689* (2013.01)
(58) Field of Classification Search
CPC .... A47J 31/0689; A47J 31/0657; A47J 31/06; B65D 2081/007; B65D 85/804;
(Continued)

(56) References Cited

U.S. PATENT DOCUMENTS

| 481,547 | A | 8/1892 | Boice |
| 747,290 | A | 12/1903 | Yantis |

(Continued)

FOREIGN PATENT DOCUMENTS

| CA | 2 661 921 A1 | 3/2008 |
| CN | 2402230 Y | 10/2000 |

(Continued)

OTHER PUBLICATIONS

Amazon.com advertisement, Keurig My K-Cup Reusable Coffee Filter—Old Model, Jan. 15, 2006, retrieved on Apr. 4, 2024, at https://www.amazon.com/Keurig-5048-Reable-Coffee-Filter/dp/B000DLB2FI/ref=asc_df_B000DLB2FI/?tag=hyprod-20&linkCode=df0&hvadid=167154327488&hvpos=&hvnetw=g&hvrand=7305666241200739661&hvpone=&hvptwo=&hvqmt=&hvdev=c&hvdvcmdl=&hvlocint=&hvlocphy=9012305&hvtargid=pla-305740401970&psc=1,, 9 pages.

(Continued)

*Primary Examiner* — Nathaniel E Wiehe
*Assistant Examiner* — Alba T Rosario-Aponte
(74) *Attorney, Agent, or Firm* — Lowe Graham Jones PLLC

(57) ABSTRACT

The beverage brewing device, which is configured for use with a beverage brewer having an inlet probe for dispensing water and an outlet probe, includes a body defining a brew chamber configured to contain a dry beverage medium and at least one outlet probe receptacle extending upwardly from a bottom surface of the body. The outlet probe receptacle is sized and configured to receive an outlet probe of a beverage brewer. A lid is removably securable to the body and is engageable with the body to selectively enclose a top opening of the body. An inlet probe opening is defined in the lid for receiving an inlet probe of the beverage brewer. At least one filter is defined within in the body, wherein the filter is configured to retain a dry beverage medium within the brew chamber while allowing a brewed beverage to pass through the brew chamber.

2 Claims, 7 Drawing Sheets

Related U.S. Application Data continuation of application No. 16/178,428, filed on Nov. 1, 2018, now Pat. No. 11,534,017, which is a continuation of application No. 14/205,206, filed on Mar. 11, 2014, now Pat. No. 10,154,751, which is a continuation of application No. 13/467,792, filed on May 9, 2012, now Pat. No. 8,707,855, which is a continuation-in-part of application No. 13/236,549, filed on Sep. 19, 2011, now abandoned.

(60) Provisional application No. 61/484,150, filed on May 9, 2011.

(58) Field of Classification Search
CPC ............ B65D 85/8043; B65D 85/8046; B65D 85/808; B65D 85/8085
USPC ................................ 99/323, 279; 426/77–84
See application file for complete search history.

(56) References Cited

U.S. PATENT DOCUMENTS

| | | |
|---|---|---|
| 846,473 A | 3/1907 | Holman |
| 865,776 A | 9/1907 | Georg |
| 1,134,661 A | 4/1915 | Allmayer |
| 1,377,316 A | 5/1921 | Clermont |
| 1,743,925 A | 1/1930 | Krause |
| 1,871,590 A | 8/1932 | D'Annunzio et al. |
| 2,433,815 A | 12/1947 | LaForge |
| 2,464,722 A | 3/1949 | Sacker |
| 2,570,997 A | 10/1951 | Willman |
| 3,022,411 A | 2/1962 | Soper et al. |
| 3,115,822 A | 12/1963 | Totten |
| 3,119,682 A | 1/1964 | Martin et al. |
| 3,120,170 A | 2/1964 | Garte |
| 3,136,241 A | 6/1964 | Price |
| 3,199,682 A | 8/1965 | Scholtz |
| 3,224,360 A | 12/1965 | Wickenberg et al. |
| 3,269,298 A | 8/1966 | Grundmann |
| 3,316,388 A | 4/1967 | Wickenberg et al. |
| 3,326,115 A | 6/1967 | Karlen et al. |
| 3,336,857 A | 8/1967 | Knodt et al. |
| 3,384,004 A | 5/1968 | Perlman et al. |
| 3,403,617 A | 10/1968 | Lampe |
| 3,405,630 A | 10/1968 | Weber, III |
| 3,411,431 A | 11/1968 | Moerlini et al. |
| 3,446,624 A | 5/1969 | Luedtke |
| 3,478,670 A | 11/1969 | Fuqua |
| 3,490,356 A | 1/1970 | Peterson et al. |
| 3,530,787 A | 9/1970 | Litterio |
| 3,583,308 A | 6/1971 | Williams |
| 3,592,126 A | 7/1971 | Dombrowik |
| 3,599,557 A | 8/1971 | Leal |
| 3,607,297 A | 9/1971 | Fasano |
| 3,695,168 A | 10/1972 | Van Brunt |
| 3,713,377 A | 1/1973 | Arnett et al. |
| 3,757,670 A | 9/1973 | Laama et al. |
| 3,812,273 A | 5/1974 | Schmidt |
| 3,844,206 A | 10/1974 | Weber |
| 3,878,772 A | 4/1975 | Nordskog |
| 3,948,157 A | 4/1976 | Layre |
| 3,952,642 A | 4/1976 | Vitous |
| 3,958,502 A | 5/1976 | Vitous |
| 4,036,121 A | 7/1977 | Bieri |
| 4,052,318 A | 10/1977 | Krebs |
| 4,056,050 A | 11/1977 | Brown |
| 4,080,299 A | 3/1978 | Bartolome |
| 4,086,848 A | 5/1978 | Hahn |
| 4,143,590 A | 3/1979 | Kasakoff |
| 4,164,644 A | 8/1979 | Remsnyder et al. |
| D255,313 S | 6/1980 | Elkerbout |
| 4,221,670 A | 9/1980 | Ziemek |
| 4,253,385 A | 3/1981 | Illy |
| 4,254,694 A | 3/1981 | Illy |
| 4,286,515 A | 9/1981 | Baumann et al. |
| 4,300,442 A | 11/1981 | Martin |
| 4,374,026 A | 2/1983 | Greutert |
| 4,429,623 A | 2/1984 | Illy |
| 4,510,853 A | 4/1985 | Takagi |
| 4,550,024 A | 10/1985 | le Granse |
| 4,603,621 A | 8/1986 | Roberts |
| 4,644,855 A | 2/1987 | Woolman et al. |
| 4,644,856 A | 2/1987 | Borgmann |
| 4,653,390 A | 3/1987 | Hayes |
| 4,703,687 A | 11/1987 | Wei |
| 4,704,954 A | 11/1987 | Mollenhoff |
| 4,706,555 A | 11/1987 | Nakamura et al. |
| 4,721,835 A | 1/1988 | Welker |
| 4,739,697 A | 4/1988 | Roberts |
| 4,759,274 A | 7/1988 | Schmidt |
| 4,800,089 A | 1/1989 | Scott |
| 4,832,845 A | 5/1989 | Hendretti |
| 4,833,979 A | 5/1989 | Garulli et al. |
| 4,858,523 A | 8/1989 | Helbling |
| 4,865,737 A | 9/1989 | McMichael |
| 4,867,880 A | 9/1989 | Pelle et al. |
| 4,882,055 A | 11/1989 | Stamstad |
| 4,921,712 A | 5/1990 | Malmquist |
| 4,967,648 A | 11/1990 | Helbling |
| 4,986,172 A | 1/1991 | Hunnicutt, Jr. |
| 4,998,463 A | 3/1991 | Precht et al. |
| 5,000,082 A | 3/1991 | Lassota |
| 5,012,059 A | 4/1991 | Boatman |
| 5,012,629 A | 5/1991 | Rehman et al. |
| 5,028,328 A | 7/1991 | Long |
| 5,046,409 A | 9/1991 | Henn |
| 5,072,660 A | 12/1991 | Helbling |
| 5,108,768 A | 4/1992 | So |
| 5,109,763 A | 5/1992 | Morris et al. |
| 5,123,335 A | 6/1992 | Aselu |
| 5,171,457 A | 12/1992 | Acuff et al. |
| 5,190,653 A | 3/1993 | Herrick et al. |
| 5,197,374 A | 3/1993 | Fond |
| 5,233,914 A | 8/1993 | English |
| 5,242,702 A | 9/1993 | Fond |
| 5,243,164 A | 9/1993 | Erickson et al. |
| D340,382 S | 10/1993 | Bannigan |
| 5,265,517 A | 11/1993 | Gilbert |
| 5,266,194 A | 11/1993 | Chiodo |
| 5,267,506 A | 12/1993 | Cai |
| 5,287,797 A | 2/1994 | Grykiewicz et al. |
| 5,298,267 A | 3/1994 | Gruenbacher |
| 5,325,765 A | 7/1994 | Sylvan |
| D349,211 S | 8/1994 | Cerato |
| 5,335,589 A | 8/1994 | Yerves, Jr. et al. |
| 5,343,799 A | 9/1994 | Fond |
| 5,347,916 A | 9/1994 | Fond et al. |
| 5,363,745 A | 11/1994 | Lin |
| 5,398,596 A | 3/1995 | Fond |
| 5,401,328 A | 3/1995 | Schmitz |
| 5,403,605 A | 4/1995 | Smith et al. |
| 5,406,882 A | 4/1995 | Shaanan |
| 5,424,083 A | 6/1995 | Lozito |
| 5,463,932 A | 11/1995 | Olson |
| 5,472,719 A | 12/1995 | Favre |
| 5,490,448 A | 2/1996 | Weller et al. |
| 5,526,733 A | 6/1996 | Klawuhn et al. |
| 5,528,730 A | 6/1996 | Yagi et al. |
| 5,531,152 A | 7/1996 | Gardosi |
| 5,562,941 A | 10/1996 | Levy |
| 5,582,730 A | 12/1996 | Hugentobler |
| 5,582,731 A | 12/1996 | Gianfranco |
| 5,605,710 A | 2/1997 | Pridonoff et al. |
| 5,633,026 A | 5/1997 | Gruenbacher |
| 5,635,233 A | 6/1997 | Levinson |
| 5,636,563 A | 6/1997 | Oppermann et al. |
| 5,637,335 A | 6/1997 | Fond |
| 5,638,741 A | 6/1997 | Cisaria |
| 5,649,412 A | 7/1997 | Binacchi |
| 5,669,287 A | 9/1997 | Jefferson, Jr. et al. |
| 5,676,041 A | 10/1997 | Glucksman et al. |
| 5,738,786 A | 4/1998 | Winnington-Ingram |
| 5,775,206 A | 7/1998 | St-Gelais |
| 5,829,340 A | 11/1998 | Yang |

(56) References Cited

U.S. PATENT DOCUMENTS

| | | |
|---|---|---|
| 5,840,189 A | 11/1998 | Sylvan et al. |
| 5,853,581 A | 12/1998 | Rayborn |
| 5,865,094 A | 2/1999 | Kealy |
| 5,865,095 A | 2/1999 | Mulle |
| 5,870,943 A | 2/1999 | Levi et al. |
| 5,875,704 A | 3/1999 | Levi et al. |
| 5,887,508 A | 3/1999 | Estaun |
| 5,887,510 A | 3/1999 | Porter |
| D407,602 S | 4/1999 | Patel |
| 5,895,672 A | 4/1999 | Cooper |
| 5,897,899 A | 4/1999 | Fond |
| 5,902,620 A | 5/1999 | Nolan |
| 5,910,205 A | 6/1999 | Patel |
| 5,924,563 A | 7/1999 | Salyers |
| 5,931,329 A | 8/1999 | Wu |
| 5,932,260 A | 8/1999 | Soughan |
| 5,988,190 A | 11/1999 | Borges |
| 6,026,733 A | 2/2000 | Orrico |
| 6,053,482 A | 4/2000 | Glenn et al. |
| 6,065,609 A | 5/2000 | Lake |
| 6,079,315 A | 6/2000 | Beaulieu |
| 6,118,933 A | 9/2000 | Roberson |
| D431,423 S | 10/2000 | Ohm et al. |
| 6,136,352 A | 10/2000 | Silverstein et al. |
| 6,161,470 A | 12/2000 | Justus |
| 6,164,191 A | 12/2000 | Liu et al. |
| 6,186,051 B1 | 2/2001 | Aarts |
| 6,189,438 B1 | 2/2001 | Bielfeldt et al. |
| 6,192,786 B1 | 2/2001 | Gasser |
| 6,202,541 B1 | 3/2001 | Cai |
| RE37,173 E | 5/2001 | Jefferson, Jr. et al. |
| 6,227,102 B1 | 5/2001 | Sham et al. |
| 6,231,909 B1 | 5/2001 | Levinson |
| 6,244,162 B1 | 6/2001 | Dahmen |
| 6,250,209 B1 | 6/2001 | Pope |
| 6,253,662 B1 | 7/2001 | Zelson |
| 6,260,476 B1 | 7/2001 | Pope |
| 6,263,781 B1 | 7/2001 | Calagui |
| 6,298,770 B1 | 10/2001 | Blankenship |
| D452,433 S | 12/2001 | Lazaris |
| D452,434 S | 12/2001 | Sweeney |
| D454,433 S | 3/2002 | Peter |
| D454,434 S | 3/2002 | McDaniel et al. |
| 6,440,256 B1 | 8/2002 | Gordon et al. |
| 6,453,800 B1 | 9/2002 | Chen |
| 6,499,388 B2 | 12/2002 | Schmed |
| 6,510,783 B1 | 1/2003 | Basile et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,645,537 B2 | 11/2003 | Sweeney |
| 6,655,260 B2 | 12/2003 | Lazaris et al. |
| 6,658,989 B2 | 12/2003 | Sweeney |
| 6,662,955 B1 | 12/2003 | Lassota |
| 6,672,200 B2 | 1/2004 | Duffy et al. |
| 6,708,600 B2 | 3/2004 | Winkler et al. |
| 6,727,484 B2 | 4/2004 | Policappelli |
| 6,740,345 B2 | 5/2004 | Cai |
| 6,748,850 B1 | 6/2004 | Kraan |
| 6,758,130 B2 | 7/2004 | Sargent et al. |
| 6,763,759 B2 | 7/2004 | Denisart |
| 6,786,134 B2 | 9/2004 | Green |
| 6,786,136 B2 | 9/2004 | Cirigliano et al. |
| 6,832,542 B2 | 12/2004 | Hu et al. |
| 6,843,165 B2 | 1/2005 | Stoner |
| 6,854,378 B2 | 2/2005 | Jarisch et al. |
| D502,362 S | 3/2005 | Lazaris et al. |
| 6,880,454 B2 | 4/2005 | Kollep |
| 6,904,840 B1 | 6/2005 | Pfeifer et al. |
| 6,912,949 B2 | 7/2005 | Brizio |
| 6,948,420 B2 | 9/2005 | Kirschner et al. |
| 6,960,295 B2 | 11/2005 | Chaouachi |
| 6,968,775 B2 | 11/2005 | Burrows et al. |
| 6,994,015 B2 | 2/2006 | Bruinsma |
| 7,047,870 B2 | 5/2006 | Gantt et al. |
| 7,081,263 B2 | 7/2006 | Albrecht |
| 7,131,369 B2 | 11/2006 | Gantt et al. |
| 7,150,219 B2 | 12/2006 | De'Longhi |
| 7,165,488 B2 | 1/2007 | Bragg et al. |
| D541,587 S | 5/2007 | Pezij |
| 7,219,600 B1 | 5/2007 | Haven |
| 7,231,870 B2 | 6/2007 | Lowe |
| 7,284,679 B2 | 10/2007 | Zill et al. |
| D560,097 S | 1/2008 | Shen |
| 7,318,372 B2 | 1/2008 | Cooke |
| 7,320,274 B2 | 1/2008 | Castellani |
| 7,328,651 B2 | 2/2008 | Halliday et al. |
| D567,021 S | 4/2008 | Bach et al. |
| 7,377,089 B2 | 5/2008 | Rapparini |
| 7,461,587 B2 | 12/2008 | Guerrero |
| 7,464,637 B1 | 12/2008 | Lin |
| 7,543,527 B2 | 6/2009 | Schmed |
| D598,706 S | 8/2009 | Neace et al. |
| 7,594,470 B2 | 9/2009 | Scarchilli |
| D606,363 S | 12/2009 | Aardenburg |
| 7,673,558 B2 | 3/2010 | Panesar et al. |
| 7,681,492 B2 | 3/2010 | Suggi Liverani et al. |
| 7,685,931 B2 | 3/2010 | Rivera |
| 7,703,381 B2 | 4/2010 | Liverani et al. |
| 7,726,233 B2 | 6/2010 | Kodden et al. |
| 7,730,829 B2 | 6/2010 | Hammad |
| 7,815,953 B2 | 10/2010 | Mastropasqua et al. |
| 7,836,820 B2 | 11/2010 | Hammad |
| 7,845,270 B2 | 12/2010 | Rahn |
| 7,856,920 B2 | 12/2010 | Schmed et al. |
| 7,866,255 B1 | 1/2011 | Wroblewski et al. |
| 7,870,821 B2 | 1/2011 | Kwon |
| 7,891,286 B2 | 2/2011 | Scarchilli |
| 7,930,972 B2 | 4/2011 | Denisart et al. |
| 7,946,217 B2 | 5/2011 | Favre et al. |
| 7,980,169 B2 | 7/2011 | Fischer |
| 7,987,768 B2 | 8/2011 | Green et al. |
| 8,033,212 B2 | 10/2011 | Liu |
| 8,047,127 B2 | 11/2011 | Lin |
| 8,051,766 B1 | 11/2011 | Yu et al. |
| D652,266 S | 1/2012 | Smyers |
| 8,087,347 B2 | 1/2012 | Halliday et al. |
| 8,147,887 B2 | 4/2012 | Dogan et al. |
| 8,291,812 B2 | 10/2012 | Rivera |
| 8,327,754 B2 | 12/2012 | Kirschner et al. |
| D677,120 S | 3/2013 | DeMiglio et al. |
| 8,418,602 B2 | 4/2013 | Magg |
| 8,470,350 B2 | 6/2013 | Gervasio |
| D688,095 S | 8/2013 | DeMiglio et al. |
| 8,561,524 B2 | 10/2013 | DeMiglio et al. |
| D694,579 S | 12/2013 | Khubani |
| 8,621,981 B2 | 1/2014 | Rivera |
| D698,649 S | 2/2014 | Quint |
| 8,707,855 B2 | 4/2014 | DeMiglio et al. |
| 8,720,320 B1 | 5/2014 | Rivera |
| 8,794,125 B1 | 8/2014 | Rivera |
| D715,649 S | 10/2014 | O'Brien |
| D721,536 S | 1/2015 | Advani |
| D723,868 S | 3/2015 | Hertaus |
| 8,967,038 B2 | 3/2015 | Rivera |
| 9,023,412 B2 | 5/2015 | Doleac et al. |
| 9,108,794 B2 | 8/2015 | Fu et al. |
| 9,113,747 B2 | 8/2015 | Rivera |
| 9,179,797 B2 | 11/2015 | Rivera |
| 9,232,871 B2 | 1/2016 | Rivera |
| 9,232,872 B2 | 1/2016 | Rivera |
| 9,242,790 B2 | 1/2016 | Rivera |
| 9,271,597 B2 | 3/2016 | Rivera |
| D764,226 S | 8/2016 | Ming |
| 9,402,501 B1 | 8/2016 | Vu |
| D767,331 S | 9/2016 | Burrows |
| D771,434 S | 11/2016 | Burrows |
| D771,435 S | 11/2016 | Cutuli et al. |
| 9,510,705 B2 | 12/2016 | Rolfes et al. |
| 9,572,452 B2 | 2/2017 | Rivera |
| 9,604,217 B2 | 3/2017 | Palmer et al. |
| D797,503 S | 9/2017 | Robotti |

(56) References Cited

U.S. PATENT DOCUMENTS

| | | |
|---|---|---|
| 9,756,974 B2 | 9/2017 | Rivera |
| 9,764,891 B1 | 9/2017 | Aviles et al. |
| 9,795,243 B2 | 10/2017 | Rivera |
| 9,833,102 B2 | 12/2017 | Peterson et al. |
| 9,907,425 B2 | 3/2018 | Rivera |
| 10,154,751 B2 | 12/2018 | DeMiglio et al. |
| 10,251,509 B2 | 4/2019 | Rivera et al. |
| D852,589 S | 7/2019 | Bertsch |
| D860,724 S | 9/2019 | Kassin et al. |
| D889,907 S | 7/2020 | Braukmann et al. |
| 10,865,039 B2 | 12/2020 | Rivera |
| 11,464,357 B2 | 10/2022 | Rivera |
| 11,737,597 B2 | 8/2023 | Rivera |
| 11,805,934 B1 | 11/2023 | Rivera |
| 11,832,755 B2 | 12/2023 | Rivera |
| 11,903,518 B2 | 2/2024 | Rivera |
| 2001/0032822 A1 | 10/2001 | Koslow |
| 2001/0043954 A1 | 11/2001 | Sweet |
| 2002/0005367 A1 | 1/2002 | Zelson |
| 2002/0023543 A1 | 2/2002 | Schmed |
| 2002/0035929 A1 | 3/2002 | Kanba et al. |
| 2002/0048621 A1 | 4/2002 | Boyd et al. |
| 2002/0059870 A1 | 5/2002 | Walters, Jr. et al. |
| 2002/0078831 A1 | 6/2002 | Cai |
| 2002/0148356 A1 | 10/2002 | Lazaris et al. |
| 2002/0148358 A1 | 10/2002 | Sweeney |
| 2003/0000887 A1 | 1/2003 | Zaske |
| 2003/0006185 A1 | 1/2003 | Hepler |
| 2003/0041739 A1 | 3/2003 | Cai |
| 2003/0167928 A1 | 9/2003 | Mulle et al. |
| 2003/0200872 A1 | 10/2003 | Lin |
| 2003/0209151 A1 | 11/2003 | Mordini |
| 2003/0213370 A1 | 11/2003 | Hammad et al. |
| 2003/0222089 A1 | 12/2003 | Hale |
| 2003/0226449 A1 | 12/2003 | Carasso |
| 2004/0005384 A1 | 1/2004 | Cai |
| 2004/0020368 A1 | 2/2004 | Cai |
| 2004/0020922 A1 | 2/2004 | Alves |
| 2004/0055472 A1 | 3/2004 | Stoner |
| 2004/0094039 A1 | 5/2004 | Brizio |
| 2004/0118290 A1 | 6/2004 | Cai |
| 2004/0182247 A1 | 9/2004 | Guerrero |
| 2004/0188459 A1 | 9/2004 | Halliday |
| 2004/0206245 A1 | 10/2004 | Halliday |
| 2004/0211322 A1 | 10/2004 | Halliday |
| 2004/0244600 A1 | 12/2004 | Lalanne-Eygun |
| 2005/0005775 A1 | 1/2005 | Chen |
| 2005/0051478 A1 | 3/2005 | Karanikos et al. |
| 2005/0095158 A1 | 5/2005 | Kirschner et al. |
| 2005/0103202 A1 | 5/2005 | Rahn et al. |
| 2005/0160918 A1 | 7/2005 | Winstanley et al. |
| 2005/0160919 A1 | 7/2005 | Balkau |
| 2005/0166763 A1 | 8/2005 | Scarchilli et al. |
| 2005/0172819 A1 | 8/2005 | Chen et al. |
| 2005/0188854 A1 | 9/2005 | Green et al. |
| 2005/0193892 A1 | 9/2005 | Rahn et al. |
| 2005/0236323 A1 | 10/2005 | Oliver |
| 2005/0257695 A1 | 11/2005 | Dobranski et al. |
| 2005/0266122 A1 | 12/2005 | Franceschi |
| 2005/0284303 A1 | 12/2005 | Zell et al. |
| 2006/0019000 A1 | 1/2006 | Zanetti |
| 2006/0081132 A1 | 4/2006 | Kief, Jr. |
| 2006/0107841 A1 | 5/2006 | Schifferle |
| 2006/0150823 A1 | 7/2006 | Thomas |
| 2006/0159815 A1 | 7/2006 | Crook et al. |
| 2006/0169150 A1 | 8/2006 | Voss et al. |
| 2006/0174769 A1 | 8/2006 | Favre et al. |
| 2006/0180030 A1 | 8/2006 | Bates et al. |
| 2006/0196364 A1 | 9/2006 | Kirschner |
| 2006/0236871 A1 | 10/2006 | Ternite et al. |
| 2006/0254428 A1 | 11/2006 | Glucksman |
| 2007/0039477 A1 | 2/2007 | Bowden |
| 2007/0157821 A1 | 7/2007 | Panesar et al. |
| 2007/0175334 A1 | 8/2007 | Halliday et al. |
| 2007/0181002 A1 | 8/2007 | Rahn |
| 2007/0186784 A1 | 8/2007 | Liverani |
| 2007/0193452 A1 | 8/2007 | Campetella et al. |
| 2007/0221069 A1 | 9/2007 | Rahn |
| 2007/0251946 A1* | 11/2007 | Urquhart ............... A47J 31/005 220/254.6 |
| 2007/0259074 A1 | 11/2007 | Searchilli |
| 2007/0277677 A1 | 12/2007 | Roberg |
| 2008/0148956 A1 | 6/2008 | Maurer |
| 2008/0196593 A1 | 8/2008 | Shrader |
| 2008/0216667 A1 | 9/2008 | Garman |
| 2009/0007793 A1 | 1/2009 | Glucksman et al. |
| 2009/0007796 A1 | 1/2009 | Ricotti |
| 2009/0101022 A1 | 4/2009 | Levin |
| 2009/0117239 A1 | 5/2009 | Bunn |
| 2009/0202691 A1 | 8/2009 | Gauger |
| 2009/0226585 A1 | 9/2009 | Wroblewski et al. |
| 2009/0229470 A1 | 9/2009 | Dorfmueller |
| 2009/0229471 A1 | 9/2009 | Lun et al. |
| 2009/0241344 A1 | 10/2009 | Mastroianni |
| 2009/0266238 A1 | 10/2009 | Mastropasqua et al. |
| 2010/0083843 A1 | 4/2010 | Denisart |
| 2010/0107889 A1 | 5/2010 | Denisart |
| 2010/0154651 A1 | 6/2010 | Skalski |
| 2010/0176037 A1 | 7/2010 | Namespetra |
| 2010/0178391 A1 | 7/2010 | MacMahon |
| 2010/0178392 A1 | 7/2010 | Yoakim |
| 2010/0178404 A1 | 7/2010 | Yoakim |
| 2010/0203208 A1 | 8/2010 | Yoakim |
| 2010/0212509 A1 | 8/2010 | Tien |
| 2010/0224078 A1 | 9/2010 | Khalifa |
| 2010/0239734 A1 | 9/2010 | Yoakim |
| 2010/0242740 A1 | 9/2010 | Shen Ku |
| 2010/0263548 A1 | 10/2010 | Kokatsu |
| 2010/0288131 A1 | 11/2010 | Kilber et al. |
| 2010/0303964 A1 | 12/2010 | Beaulieu et al. |
| 2011/0073607 A1 | 3/2011 | Fu et al. |
| 2011/0100229 A1 | 5/2011 | Rivera |
| 2011/0209623 A1 | 9/2011 | Leung et al. |
| 2011/0274802 A1* | 11/2011 | Rivera ............... B65D 85/8061 426/431 |
| 2011/0303095 A1 | 12/2011 | Fu et al. |
| 2012/0167774 A1 | 7/2012 | Mordini et al. |
| 2012/0207895 A1 | 8/2012 | Rivera |
| 2012/0207896 A1 | 8/2012 | Rivera |
| 2012/0225175 A1 | 9/2012 | Lown |
| 2012/0276264 A1 | 11/2012 | Rivera |
| 2012/0285330 A1 | 11/2012 | Demiglio |
| 2012/0285334 A1 | 11/2012 | DeMiglio |
| 2013/0017303 A1* | 1/2013 | Vu ..................... A47J 31/0689 426/433 |
| 2013/0025466 A1 | 1/2013 | Fu et al. |
| 2013/0055904 A1 | 3/2013 | DeMiglio et al. |
| 2013/0139699 A1 | 6/2013 | Rivera |
| 2013/0156897 A1 | 6/2013 | Goldstein |
| 2013/0224343 A1 | 8/2013 | Tremblay |
| 2013/0340626 A1 | 12/2013 | Oh |
| 2014/0245895 A1 | 9/2014 | DeMiglio et al. |
| 2014/0272048 A1 | 9/2014 | Hristov et al. |
| 2014/0287105 A1 | 9/2014 | Husband et al. |
| 2015/0068404 A1 | 3/2015 | Rivera |
| 2016/0150909 A1 | 6/2016 | Rivera |
| 2016/0302613 A1 | 10/2016 | Cross et al. |
| 2016/0367064 A1 | 12/2016 | DeMiglio |
| 2017/0367519 A1 | 12/2017 | Capitani |
| 2019/0069710 A1 | 3/2019 | DeMiglio et al. |
| 2020/0305634 A1 | 10/2020 | Rivera |
| 2021/0127889 A1 | 5/2021 | Sasena et al. |
| 2021/0137302 A1 | 5/2021 | Rivera |
| 2021/0289978 A1 | 9/2021 | Kruger et al. |
| 2022/0007877 A1 | 1/2022 | Rivera |
| 2022/0079372 A1 | 3/2022 | Rivera |
| 2022/0369855 A1 | 11/2022 | Rivera |

FOREIGN PATENT DOCUMENTS

| | | |
|---|---|---|
| CN | 2615077 Y | 5/2004 |
| CN | 2676770 Y | 2/2005 |
| CN | 1714716 A | 1/2006 |
| CN | 2850479 Y | 12/2006 |

(56) References Cited

FOREIGN PATENT DOCUMENTS

| | | |
|---|---|---|
| CN | 201223298 Y | 4/2009 |
| DE | 41 35 660 A1 | 5/1992 |
| DE | 202 18 335 U1 | 2/2003 |
| DE | 102011012860 A1 | 12/2012 |
| EP | 1183195 A1 | 3/2002 |
| EP | 1364605 | 11/2003 |
| EP | 1 774 879 A1 | 4/2007 |
| EP | 1837294 B1 | 9/2007 |
| EP | 1868473 | 12/2007 |
| EP | 1886605 | 2/2008 |
| EP | 2580145 | 4/2013 |
| EP | 1 663 813 B1 | 4/2014 |
| FR | 948422 | 6/1947 |
| GB | 865199 A | 4/1961 |
| GB | 2397496 | 7/2004 |
| GB | 2488799 A | 9/2012 |
| JP | 1980066625 U | 5/1980 |
| JP | S59103627 | 6/1984 |
| JP | S60222013 | 11/1985 |
| JP | S61149114 | 7/1986 |
| JP | H0580424 U | 11/1993 |
| JP | H105134 | 1/1998 |
| JP | 2003061827 A | 3/2003 |
| JP | 2004215763 A | 8/2004 |
| JP | 2012-515007 | 7/2012 |
| KR | 2019960005703 | 7/1996 |
| KR | 200535744 B1 | 1/2006 |
| NZ | 248659 A | 12/1994 |
| WO | 00/68113 | 11/2000 |
| WO | 2004065256 | 8/2004 |
| WO | 2005079637 | 9/2005 |
| WO | 2005/092160 A1 | 10/2005 |
| WO | 2006/126104 | 11/2006 |
| WO | 2008058731 | 5/2008 |
| WO | 2011153272 | 12/2011 |
| WO | 2012/010760 | 1/2012 |
| WO | 2012142949 | 10/2012 |

OTHER PUBLICATIONS

CAFC 2016-1841, Decision, dated May 23, 2017, 15 pages.
CAFC 2018-2215, 2018-2254, Decision, dated Jan. 13, 2020, 24 pages.
CAFC 2015-1683, Judgment, dated Apr. 8, 2016, 2 pages.
Notice of Intent to Issue a Reexam Certificate, mailed Jan. 26, 2017, in U.S. Appl. No. 90/013,729, 7 pages.
PTAB Case IPR2014-00042, Final Written Decision, dated Feb. 6, 2015, 25 pages.
Declaration of Robert Vu Under 37 CFR 1.312, dated Jan. 3, 2016, in U.S. Appl. No. 13/181,478, 18 pages.
Davids, Kenneth, "Coffee: A Guide to Buying, Brewing, and Enjoying," New York: St. Martin's Griffin, 2001.
Bell, J., "The POD Rush Is on in Italy," Tea & Coffee Trade Journal 171(3):18, Mar. 1999.
Terracin, S.S., "Espresso Pods," Tea & Coffee Trade Journal 172(9):39, Sep. 2000.
Office Action mailed Feb. 14, 2013, issued in corresponding U.S. Appl. No. 13/666,693, 13 pages.
Final Office Action mailed May 14, 2013, issued in corresponding U.S. Appl. No. 13/666,693, 16 pages.
Ekobrew 20 kcup, Nov. 10, 2018. influenster.com, Apr. 22, 2021. URL: https://www.influenster.com/reviews/ekobrew-20-k-cup-reusable-coffee-filter-orange-reusable-filter (Year: 2018).
Eco-Flow2 Perfect pod, Oct. 25, 2018. amazon.com, Apr. 22, 2021. URL: https://www.amazon.com/Eco-Flow-2-0-by-Perfect-Pod/dp/B07JPJPKDD (Year: 2018).
Solofill Cup K3. (Oct. 15, 2010). Retrieved from https://www.officedepot.com/a/products/579044/Solofill-Cup-K3-Chrome-Refillable-Filter/.
International Search Report and Written Opinion of the International Searching Authority completed Aug. 31, 2016, in International Patent Application No. PCT/US16/38791, 6 pages.

\* cited by examiner

BEVERAGE BREWING DEVICE

PRIORITY CLAIM

This application is a divisional of U.S. patent application Ser. No. 16/835,165, filed Mar. 30, 2020; which is a continuation of U.S. patent application Ser. No. 16/178,428, filed Nov. 1, 2018 (now U.S. Pat. No. 11,534,017, issued Dec. 27, 2022); which is a continuation of U.S. patent application Ser. No. 14/205,206, filed Mar. 11, 2014 (now U.S. Pat. No. 10,154,751, issued Dec. 18, 2018); which is a continuation of U.S. patent application Ser. No. 13/467,792, filed May 9, 2012 (now U.S. Pat. No. 8,707,855, issued Apr. 29, 2014); which is a continuation-in-part of U.S. patent application Ser. No. 13/236,549, filed Sep. 19, 2011 (now abandoned); which claims the benefit of U.S. Provisional Patent Application No. 61/484,150, filed May 9, 2011, the contents of which are incorporated herein by reference in their entirety.

BACKGROUND

There are numerous devices available today for making a single-serve brewed beverage, such as the single-server brewers shown and described in, for example, U.S. Pat. Nos. 6,708,600, and 6,079,315, the disclosures of which are hereby expressly incorporated by reference herein.

In a typical single-serve beverage brewer, a disposable beverage filter cartridge containing a dry beverage medium (such as tea or coffee) is disposed within a filter cartridge holder or brewing holster. To brew the beverage, the filter cartridge is pierced by inlet and outlet probes to accommodate a through-flow of metered hot water. The hot water infuses the dry beverage medium contained in the cartridge to thereby produce a single serving of the beverage. After the beverage is brewed, the cartridge is removed from the cartridge holder and it is discarded.

By requiring the use of the disposable cartridges, the consumer is limited to the beverage selection of the cartridges on hand. Moreover, with each cartridge being disposed of after use, there is much needless waste. Thus there is a need for a reusable cartridge filter suitable for use with a beverage brewer described above that can be used with any desired dry beverage medium (coffee, tea, etc.).

SUMMARY

The beverage brewing device is configured for use with a beverage brewer having an Inlet probe for dispensing water and an outlet probe. The beverage brewing device includes a body defining a brew chamber configured to contain a dry beverage medium and at least one outlet probe receptacle defined in the body and extending upwardly from a bottom surface of the body. The at least one outlet probe receptacle is sized and configured to receive an outlet probe of a beverage brewer. A lid is ably securable to the body and is engageable with the body to selectively enclose a top opening of the body. An inlet probe opening is defined in the lid for receiving an inlet probe of the beverage brewer. At least one filter is defined within in the body, wherein the filter is configured to retain a dry beverage medium within the brew chamber while allowing a brewed beverage to pass through the brew chamber.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description when taken in conjunction with the accompanying drawings, wherein.

DETAILED DESCRIPTION

Figure 1:
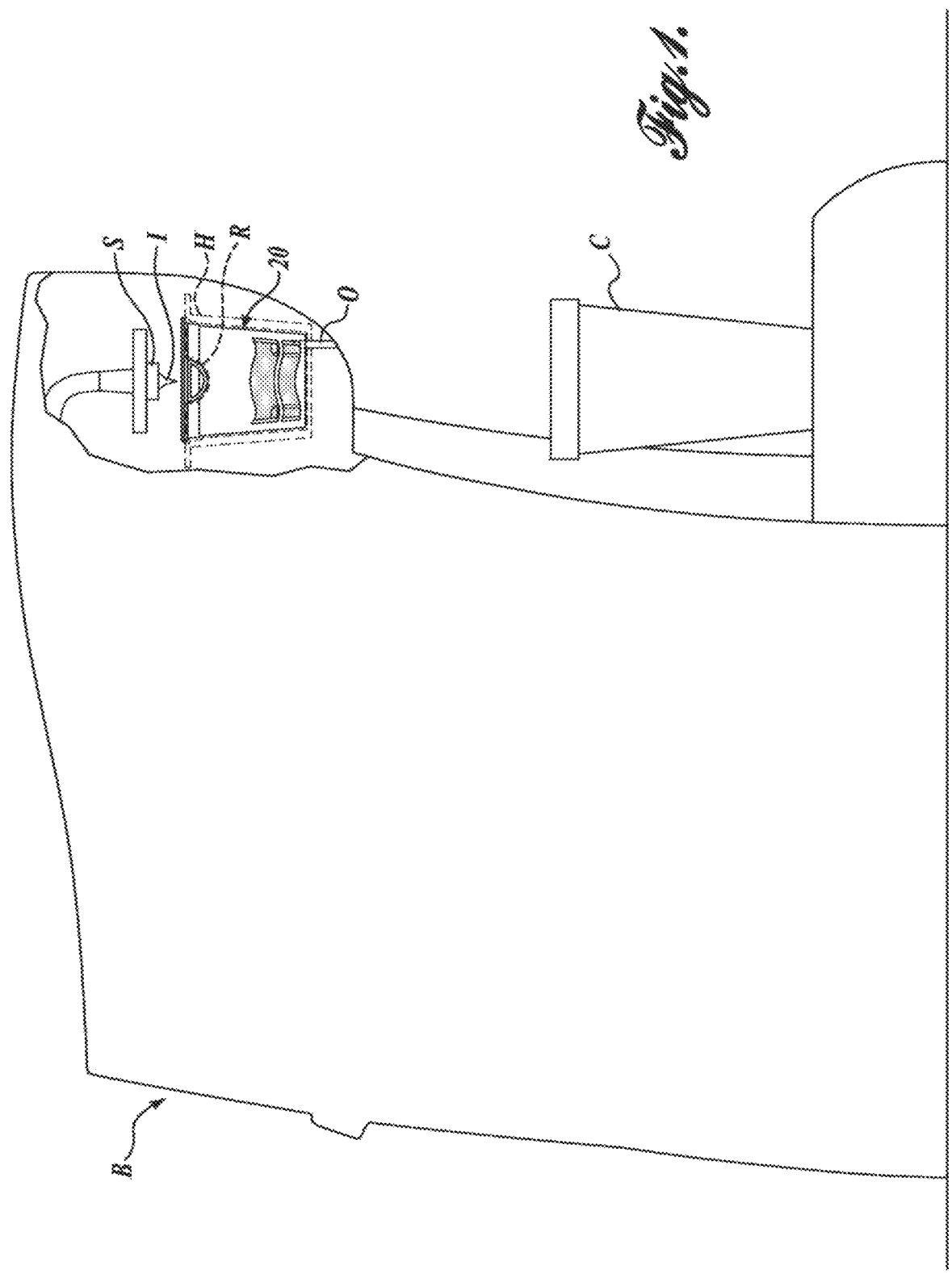
FIG. 1 is an isometric view of a beverage brewing device formed in accordance with a first exemplary embodiment of the present disclosure, wherein the beverage brewing device is shown in use with a beverage brewer.

A reusable beverage brewing device 20 formed in accordance with a first exemplary embodiment of the present disclosure may best be seen by referring to FIG. 1. The beverage brewing device 20 is suitable for use with multi-use, single-cup beverage brewer, such as a coffee brewer B. More specifically, the beverage brewing device 20 is configured to contain a preselected dry beverage medium, such as coffee grounds, and interface with inlet and outlet probes I and O of a beverage brewer B when received within a brewing holster H (shown in bidden lines only) of the beverage brewer B to brew a beverage for dispensing into a cup C. For instance, the beverage brewing device 20 is designed to work with most Keurig™ single-cup beverage brewers, which is similar to the beverage brewer B depicted in FIG. 1. However, it should be appreciated that the beverage brewing device 20 may instead be used with any suitable beverage brewer. Accordingly, the illustrations and depictions set forth herein shall not be seen as limiting the scope of the claimed subject matter.

Figure 2:
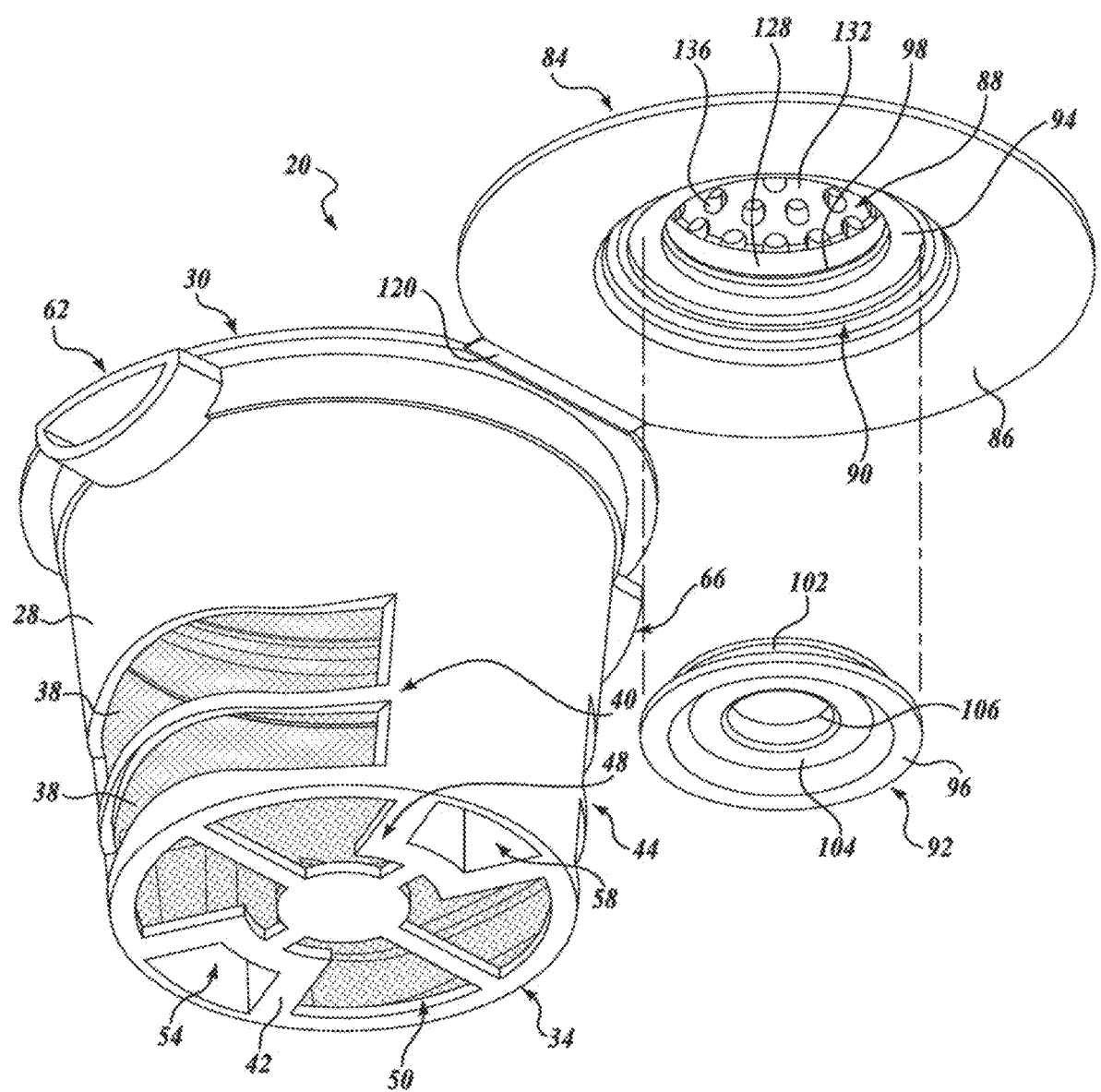
FIG. 2 is a bottom, partially exploded isometric view of the beverage brewing device of FIG. 1.
Figure 3:
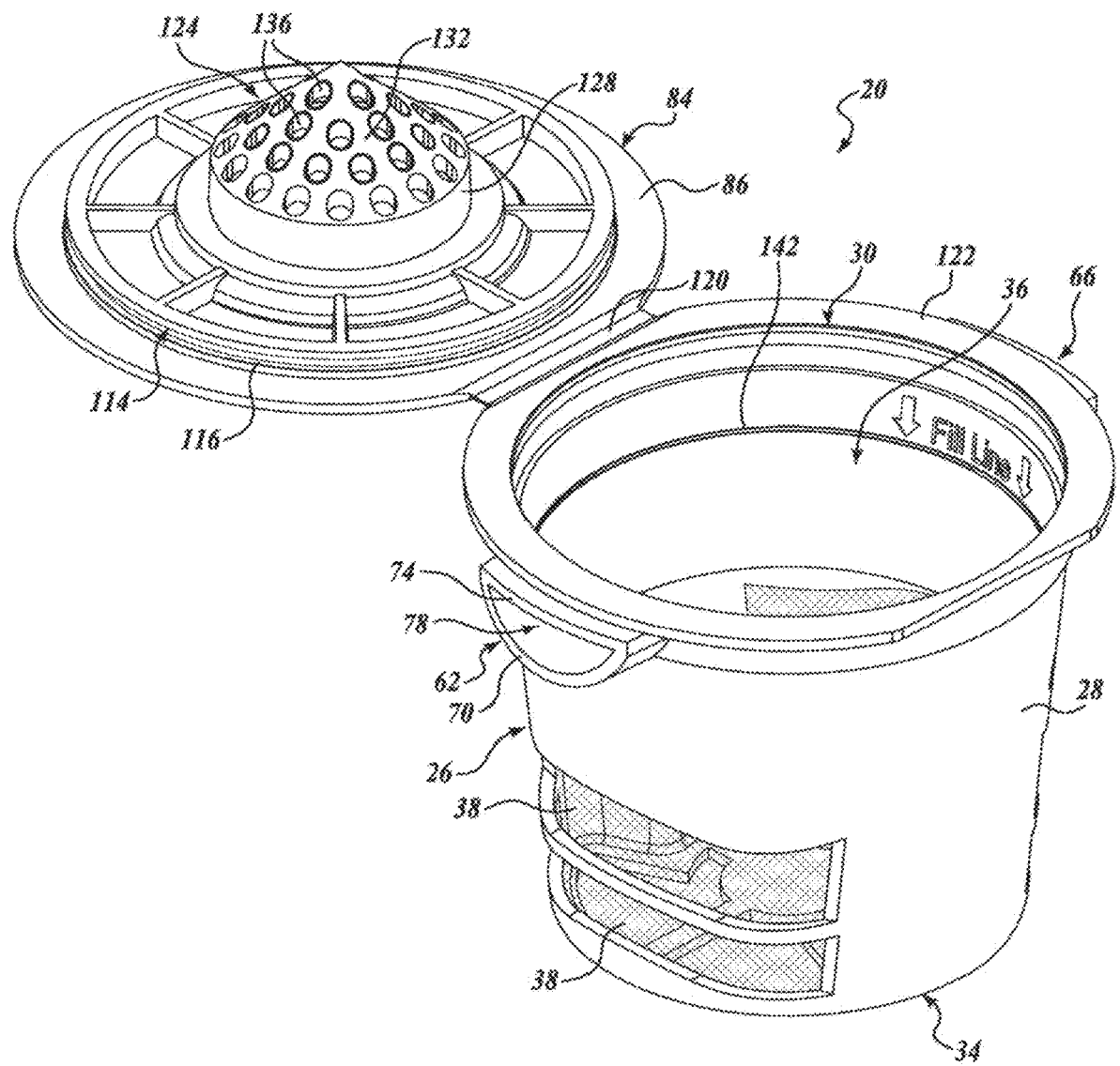
FIG. 3 is a top isometric view of the beverage brewing device of FIG. 1.

Referring to FIGS. 2 and 3, the beverage brewing device 20 will now be described in detail. The beverage brewing device 20 has an overall shape and configuration to be removably received w thin the brewing holster H of the beverage brewer B. More specifically, the beverage brewing device 20 has a substantially cup-shaped, cylindrical body 26 that corresponds in shape and size to the interior of the brewing holster HI of the beverage brewer B.

The cup-shaped body 26 has a curved, substantially vertical sidewall 28 extending between an open top end 30 and a closed bottom end 34 defined by a substantially flat bottom surface 42. The sidewall 28 and closed bottom end 34 define a brew chamber 36 within the interior of the cup-shaped body 26. The brew chamber 36 is sized and shaped to receive the dry beverage medium, such as coffee grounds.

A filter 38 is disposed within openings in the body 26 for filtering water as it passes through the brew chamber 36.

More specifically, the filter 38 allows a brewed beverage to pass therethrough while retaining the dry beverage medium within the body 26. In that regard, any suitable reusable, durable filter may be used, such as a micro-screen mesh filter made from metal (such as gold or stainless steel, gold-tone filters), plastic, or fabric. In this manner, the brewed beverage, such as coffee, flows through the dry beverage medium contained within the body 26 and ultimately through the filter 38 and into a cup C positioned below the brewing holster H of a beverage brewer B.

Although the filter 38 may be disposed in any suitable openings within the body 26, in the depicted embodiment, t e filter 38 disposed with openings in the sidewall 28 and the bottom surface 42 of the body 26. Specifically, the sidewall 28 includes a first pair of openings 40 disposed opposite a second pair of substantially identical openings 44 (only partially shown for case of illustration). The bottom surface 42 similarly includes a first pair of openings 48 disposed opposite a second pair of substantially identical openings 50. The brewed beverage may flow through the openings 40 and 44 in the sidewall and through the openings 48 and 50 in the bottom surface 42 into the brewing holster H. The brewing holster H and/or the beverage brewer B may include suitable structure (not shown) to funnel or otherwise direct the brewed beverage down into the cup C for consumption.

The filter 38 may be secured within the body 26 in any suitable manner such that the edges of the filter 38 do not form an abrupt edge within the interior of the brew chamber 36. For instance, the filter 38 may be molded within the body 26 or otherwise fused into the sidewall 28 and the bottom surface 42 of the body 26. In this manner, a smooth, substantially seamless transition is defined between the filter 38 and the body 26. With this substantially seamless transition, the filter 38 has no exposed edges or frayed wires. As such, any dry beverage medium, such as coffee grounds, will not become lodged within crevices that would otherwise be created by any exposed or frayed edges.

As noted above, the closed bottom end 34 is defined by a substantially flat bottom surface 42. With a substantially flat bottom surface 42, the beverage brewing device 20 can be easily set onto a surface, such as a counter, and the brew chamber 36 can be filled with the desired dry beverage medium. In other words, the substantially flat bottom surface 42 allows for hands-free filling and less mess when filling the brew chamber 36 with, for instance, coffee grounds.

With the brew chamber 36 filled with, for instance, coffee grounds, the beverage Brewing device 20 may be disposed within a brewing holster H of a beverage brewer B to brew a beverage. As discussed briefly above, the beverage brewing device 20 is configured for use within a brewing holster H of a beverage brewer having an outlet probe O that extends upwardly into the brewing holster compartment of the beverage brewer B. In that regard, the body 26 includes first and second opposing outlet probe receptacles 54 and 58 extending upwardly from the bottom surface 42 of the body 26. Each outlet probe receptacle 54 and 58 defines an opening of a sufficient size and is of a sufficient depth to receive the outlet probe O so that the beverage brewing device 20 may be fully received within the brewing holster H. Moreover, the receptacles 54 and 58 define a continuous extension of the bottom surface 42 to fluidly isolate the outlet probe O from the brew chamber 36 when the outlet probe O is received within one of the first and second outlet probe receptacles 34 or 58.

The first and second outlet probe receptacles 54 and 58 are disposed on opposite sides of the bottom surface 42 of the body 26 such that the beverage brewer 20 may be configured in one of two positions to seat within the brewing holster H (i.e., with one of the first and second opposing outlet probe receptacles 54 and 58 receiving the outlet probe O). It should be appreciated that the body 26 may instead include only one outlet probe receptacle such that the beverage brewer 20 is positionable in only one position within the brewing holster H. As yet another alternative, three or more outlet probe receptacles may instead be formed within the body 26 such that the beverage brewer 20 may be configured in three or more positions within the brewing holster. Even further, it should be appreciated that the outlet probe receptacle may instead be defined as a single annular receptacle extending along the circumferential edge of the bottom surface 42 of the body 26. In this regard, the beverage brewing device 20 could be seated within the brewing holster H in an unlimited number of positions with the outlet probe O received anywhere in the annular receptacle. Thus, the descriptions and illustrations provided herein should not be seen as limiting.

Each of the first and second opposing outlet probe receptacles 54 and 58 extend upwardly from the bottom surface 42 of the body 26 to receive the outlet probe O when the beverage brewing device 20 is received within the brewing holster H. In this manner, the bottom surface 42 of the body 26 can remain substantially flat to provide at least the benefits noted above, with the receptacles 54 and 58 extending upwardly therefrom into the brew char Der of the body 26 to receive the outlet probe O.

Moreover, by forming the outlet probe receptacles 54 and 58 within the bottom surface 42 and positioning the outlet probe receptacles 54 and 58 to engage the outlet probe O in one of two positions (rather than, for instance, having an entire bottom cavity suitable to accept the outlet probe in any number of positions), the body 26 can effectively have a deeper, larger interior brew chamber capacity. A larger brew chamber 36, as can be appreciated by one of ordinary skill in the art, can bold more dry beverage medium, such as coffee grounds, and can help create more turbulence during brewing for a more uniform, more efficient, and more thorough leverage extraction. The increased internal volume of the brew chamber 36 therefore accommodates consumers that prefer a stronger brew or more ounces of brewed coffee.

The body 26 is also formed such that its interior surface, including the surface defined by the outlet probe receptacles 54 and 58, has substantially rounded edges. As a result, the interior surface of the body 26 includes no hard-edged transitions and no crevices or corners where coffee grounds or other dry beverage mediums can get stuck. This helps ensure an easier cleanup for the consumer after the use of the beverage brewing device 20. In this manner, after each use, the beverage brewing device 20 may be quickly cleaned and reused for brewing another beverage.

To help align the beverage brewing device 20 within the brewing holster H such that the one of the first and second opposing outlet probe receptacles 54 and 58 receives the outlet probe O, the beverage brewing device 20 may include first and second opposing grips 62 and 66 that are receivable within correspondingly shaped cavities R (only one cavity R shown in hidden lines in FIG. 1 for clarity) in the brewing holster H when the beverage brewer 20 is disposed in the brewing position. The first and second grips 62 and 66 protrude from an exterior surface of the curved sidewall 28 of the body 26. The grips 62 and 66 may be any suitable shape and size such that they are receivable within correspondingly shaped first and second cavities in the brewing holster H. In the depicted embodiment, each of the first and second grips 62 and 66 include a curved lower grip portion 70 that is somewhat semi-circular in shape. The curved lower grip portion 70 is receivable within the correspondingly shaped curved cavity R defined within the brewing holster H.

With the curved lower grip portion 70 of each of the first and second grips 62 and 66 received within the correspondingly shaped curved cavity R of the brewing holster H, the beverage brewing device 20 is aligned within the brewing bolster H such that one of the first and second opposing outlet probe receptacles 54 and 58 receives the outlet probe O. Thus, the positioning of the grips 62 and 66 within the cavities R ensures that the body 26 is positioned within the brewing holster H in only in one of two positions, separated by one hundred eighty degrees (180°).

In addition to positioning the beverage brewing device 20 within the brewing holster H, the first and second grips 62 and 66 are sized and configured be graspable by a user for helping to insert and remove the beverage brewing device 20 from within the brewing holster H. In that regard, a substantially flat upper grip portion 74 extends across the diameter of the semi-circular shape of the curved lower grip portion 70. Moreover, the first and second grips 62 and 66 are formed near the upper open end of the body 26 such that the upper grip portion 74 is sufficiently graspable by a user to remove the brew device 20 from within the brew holster H. For instance, the first and second grips 62 and 66 may be formed on the body 26 such that at least the upper grip portion 74 protrudes from an upper open end of the brewing holster H when the beverage brewing device 20 is received within the brewing holster HI in the brewing position.

To mid in grasping the first and second grips 62 and 66, the upper grip portion 74 and lower grip portion 70 define a gripping cavity 78 that beverage brewing device 20 extends from the outer edge of the lower and upper grip portions 70 and 74 to the body 26 (or near the body 26). The gripping cavity 78 may be sized, for instance, to accommodate a user's fingertip when gripping the upper grip portion 74 to insert and remove the beverage brewing device 20 from within the brewing holster H.

The first and second grips 62 and 66 are also designed to help dissipate heat generated within the brew chamber 36 of the body 26 when brewing a beverage. The lower grip portion 70 and upper grip portion 74 extend from the outer surface of the sidewall 28 of the body 26 with a cavity 78 defined by the lower and upper grip portions 70 and 74. As such, the surface area of the lower and upper grip portions 70 and 74 are maximized to help dissipate heat. The heat dissipating design of the first and second grips 62 and 66 helps insulate the user from the post-brewing temperature of the beverage brewing device 20. Accordingly, the beverage brewing device 20 can be safely and more quickly removed from the brewing holster H after the beverage is brewed.

Figure 4:
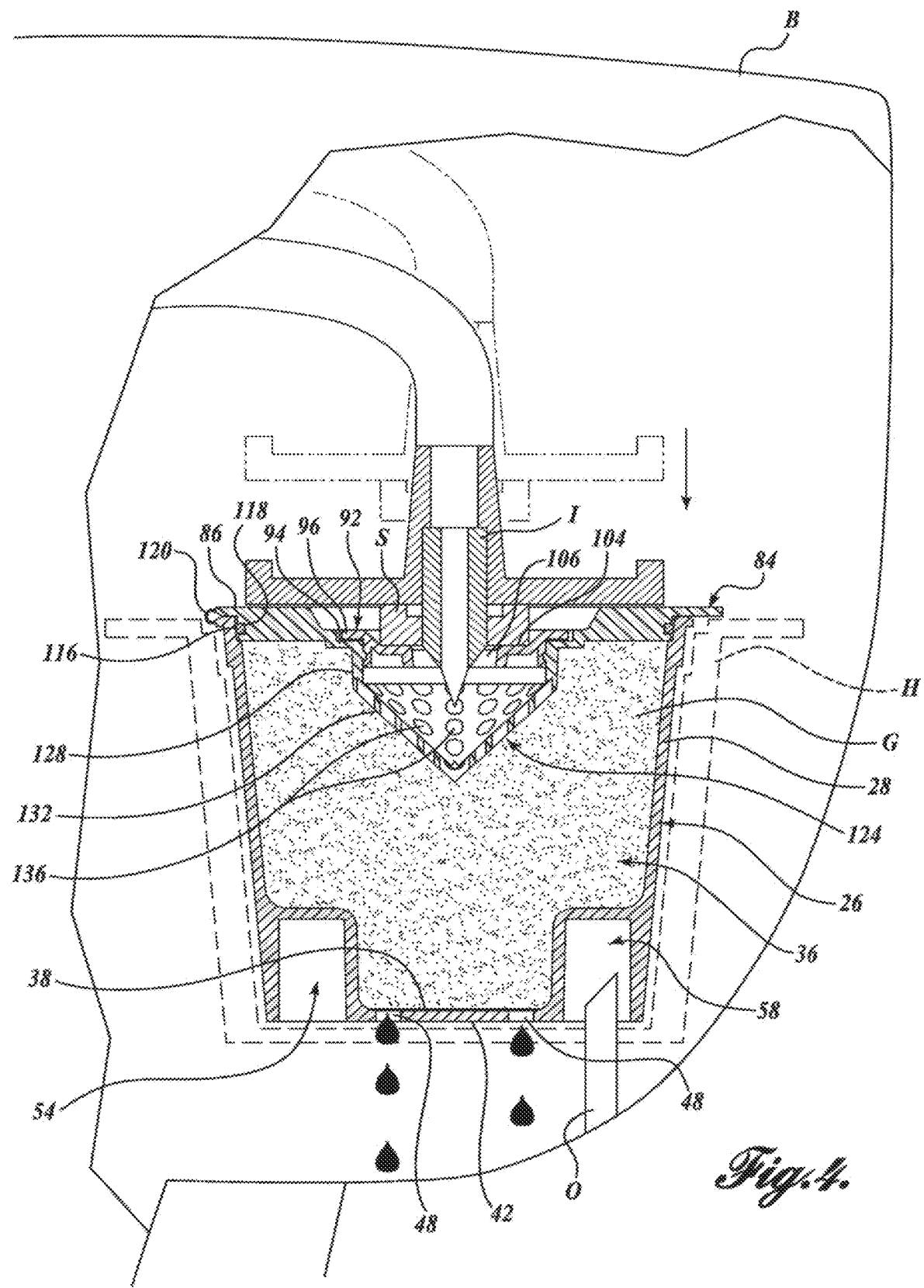
FIG. 4 is cross-sectional view of the beverage brewing device of FIG. 1 shown in use with the beverage brewer.

Referring additionally to FIG. 4, before positioning the body 26 within the brewing holster HI for brewing a beverage, the brewing chamber 36 is first enclosed by a removable lid 84. The lid 84 is sized and configured on an exterior side to mate with the inlet probe I of a beverage brewer B when the beverage brewing device 20 is received within a brewing holster H. (See FIG. 2). Moreover, the lid 84 is sized and configured on an interior side to seat within the top opening defined by the body 26 and distribute water received from the inlet probe I for brewing. (See FIG. 3).

Referring to FIGS. 2 and 4, the exterior side of the lid 84 suitable for mating with the inlet probe I of a beverage brewer B will first be described in detail. The lid 84 includes a lid body 86 that is substantially circular in overall shape to match the circular top opening defined by the cylindrical or cup-shaped body 26 of the beverage brewing device 20. The lid body 86 defines a substantially flat upper surface such that when the lid 84 is closed, the upper surface of the lid body 86 is suitable to mate with a flat portion of an inlet probe assembly of the beverage brewer B (see FIG. 4).

When closed, the lid 84 is suitable for receiving the inlet probe I of the beverage brewer B and then distributing the water from the inlet probe I into the brew chamber 36 of the beverage brewing device 20 for brewing a beverage. In that regard, a dispersion cone opening 88 is defined in substantially the center of the lid body 86. The dispersion cone opening 88 is configured to place the inlet probe I into fluid communication with a dispersion cone 124 suitable for maximizing the water volume intake capacity of water from the inlet probe I.

The dispersion cone opening 88 is in fluid communication with a stepped receptacle 90 formed within the lid body 86 that is sized and configured to scalingly receive an elastomeric receptacle plug 92 therein. The stepped receptacle 90 is substantially circular in overall shape and extends downwardly from the substantially flat upper surface of the lid body 86. The stepped receptacle 90 includes a transverse plug shoulder 94 surrounding the dispersion cone opening 88 that is configured to abut against a receptacle shoulder portion 96 of the receptacle plug 92 when the plug 92 is received therein.

The stepped receptacle 90 further defines an annular protrusion 98 formed inwardly of the transverse plug shoulder 94 (i.e., toward the dispersion cone assembly 110) that is configured to releasably receive an annular recess 102 of the receptacle plug 92. The interface of the annular protrusion 98 and the annular recess 102 defines a seal-tight fit between the stepped receptacle 90 and the receptacle plug 92. Moreover, when the annular recess 102 is received on the annular protrusion 98, a snap-fit is defined therebetween to indicate to the user that the receptacle plug 92 is fully received within the stepped receptacle 90.

When received within the stepped receptacle 90, the receptacle plug 92 is sized and configured to sealingly engage the inlet probe I or its surrounding inlet probe assembly. More specifically, the receptacle plug 92 defines a transverse inlet probe shoulder 104 surrounding an inlet probe opening 106. The inlet probe shoulder 104 is sized to engage an inlet probe shoulder S surrounding the inlet probe I of the beverage brewer B. In that regard, the inlet probe opening 106 is smaller in diameter than the opening defined by the stepped receptacle 90 and the dispersion cone opening 88.

When the inlet probe assembly is lowered for brewing, the inlet probe shoulder S is lowered into scaling engagement with the inlet probe shoulder 104 and the inlet probe I protrudes through the inlet probe opening 106. The inlet probe I is also held in substantial fixed relation relative to the beverage brewing device 20 when the inlet probe shoulder S is scaled against the receptacle plug 92 for brewing. It should be appreciated that the receptacle plug 92 may instead be configured to seal against the inlet probe I or another portion of the inlet probe assembly in another manner without departing from the scope of the present disclosure. The inlet probe I protrudes through the inlet probe opening 106 and down through the dispersion cone opening 88 toward the interior side of the lid 84 to distribute water for brewing.

Referring to FIGS. 3 and 4, the interior side of the lid 84 suitable for enclosing the brew chamber 36 within the body 26 and for distributing water received from the inlet probe I for brewing will now be described in detail. The interior of the Bid 84 is sized and configured to sealingly mate with the top open end of the body 26. In that regard, a circular or annular protrusion 114 is concentrically formed on the interior surface of the lid 84 that is sized and shaped to seat within the top opening defined by the body 26 of the beverage brewing device 20.

An annular seal 116 is disposed within an annular recess 118 extending around the annular protrusion 114. The annular seal 116 is configured to seal against the interior surface of the body 26 when the annular protrusion 114 is received within the top opening of the body 26. Any suitable seal may be used, such as a silicone seal that is heat resistant for withstanding the temperatures of brewing. The annular seal 116 defines a watertight seal between the annular protrusion 114 and the body 26 when the annular protrusion 114 is seated within the top opening defined by the body 26. In this manner, when the lid 84 is moved into the closed position, the lid 84 sealingly encloses the brew chamber 36 of the beverage brewing device 20 for brewing.

The lid 84 is hingedly secured to the body 26 such that the lid 84 may be moved between open and closed positions. The lid 84 may be hingedly secured to the body 26 in any suitable manner, such as through an integrated flexible hinge 120 extending between the lid body 86 and a fanged rim 122 formed substantially transversely around the top open end of the body 26. The flexible hinge 120 defines a hinge axis that is substantially tangent to the outer circumference of the lid 84 and the flanged rim 122. In this manner, the flexible hinge 120 allows the lid 84 to move between an open position, wherein the interior surface of the lid body 86 can be positioned substantially co-planer with the upper surface of the flanged rim 122 (see FIG. 3), and a closed position, wherein the interior surface of the lid body 86 is adjacent to or abutted against the upper surface of the Danged rim 122 (see FIG. 4).

When the lid 84 is in the closed position, as shown in FIG. 4, the inlet probe I is positioned to extend through the inlet probe opening 106 in the receptacle plug 92 to release water into a dispersion cone 124 formed on the interior surface of the lid body 86. The dispersion cone 124 is configured to help distribute water released from the inlet probe I.

More specifically, the dispersion cone 124 substantially encloses the dispersion cone opening 88 to place the dispersion cone opening 88 into fluid communication with the brew chamber 36. In that regard, the dispersion cone 124 includes a dispersion cone body having a hollow cylindrical portion 128 extending from the interior surface of the lid body 86 and surrounding the dispersion cone opening 88. The dispersion cone body further includes a hollow conical 1 portion 132 extending from the cylindrical portion 128 to enclose the dispersion cone opening 88. A plurality of openings 136 is formed within the conical portion 132 to place the dispersion cone 124 into fluid communication with the brew chamber 36 and transfer fluid from the inlet probe I into the brew chamber 36.

When the Hid 84 is in the closed position, as depicted in FIG. 4, the dispersion cone 124 extends downwardly at least partially into the brew chamber 36. In this manner, when a dry beverage medium, such as coffee grounds G, is disposed within the brew chamber 36, the dispersion cone 124 can help tamp, or pack the coffee grounds G into the brew chamber 36 for a better brew. As is well known in the coffee brewing Industry, tamping coffee grounds firmly and uniformly within a brew chamber forces water to flow through the grounds in a manner that extracts the best of the coffee ground's flavors. With firm and even tamping, the water has no choice but to flow through all of the coffee grounds uniformly. The same can be appreciated with other types of dry beverage mediums, such as tea.

When the brew chamber 36 is filled with coffee grounds G up to a certain minimum or maximum level, which can be indicated to the user by a fill line Indicator 142, the dispersion cone 124 is forced downwardly into the coffee grounds) when the lid 84 is closed, thereby occupying space within the brew chamber 36 and tamping the coffee grounds O within the brew chamber 36. In that regard, the overall size or height of the cylindrical portion 128 of the dispersion cone 124 may be varied to change the depth of the dispersion cone 124 within brew chamber 36. Thus, for a user who prefers, for instance, brewed coffee that is less strong in flavor, the dispersion cone 124 could extend much deeper within the brew chamber 36 to reach and tamp coffee grounds at a lower fill line level (which would therefore produce a less strong brew). Thus, it should be appreciated that the embodiment described and illustrated herein is exemplary only and is not intended to limit the scope of the claimed subject matter.

In addition to tamping the coffee grounds G within the brew chamber 36, the dispersion cone 124 helps distribute the water from the inlet probe I to the coffee grounds G to aid in driving water flow uniformly through the coffee grounds G. Referring to FIG. 4, with the inlet probe I scalingly received within the receptacle plug 92, the water is first directed into a small, well-defined, sealed inlet probe opening 106 defined by the receptacle plug 92 and then expanded into the dispersion cone 124 for greater water dispersion capacity.

The dispersion cone 124 defines a water chamber for receiving and pressurizing water released from the inlet probe I. The water from the inlet probe I fills the chamber defined by the dispersion cone 124 and then slowly exits the dispersion cone 124 through the smaller openings 136. The gradual flow of water through the openings 136 in the dispersion cone 124 helps prevent the coffee grounds G from being soaked all at once. The shape and configuration of the dispersion cone 124 also positions the openings 136 within the brew chamber 36 in an even, distributed manner to help direct water in a substantially even, uniform manner throughout the coffee grounds G. This allows for a better extraction of the brewed beverage from the coffee grounds G and, as a result, a better cup of brewed coffee.

The sealed inlet probe opening 106 defined by the receptacle plug 92 also helps maximize the pressure of the water flowing through dispersion cone 124 during the brewing process. Referring to FIG. 4, with the inlet probe I sealingly received within the inlet probe opening 106 of the receptacle plug 92, water from the inlet probe I flowing at a first flow rate is forced into the sealed area defined by the inlet probe I, the inlet probe shoulder S, the receptacle plug 92, and the dispersion cone 124. The water flows out of the small dispersion cone openings 136 at a second, slower flow rate due to the smaller opening 136 in the dispersion cone 124. In this manner, the water pressure is maximized as it flows out of the dispersion cone openings 136 into the coffee grounds G for extraction of the brewed beverage. This helps ensure that the water exiting the dispersion cone 124 reaches the coffee grounds packed near the interior sidewall 28 of the beverage brewing device 20 rather than merely dripping down just below the dispersion cone 124. In this manner, a more uniform, even brew will result.

The body 26 and lid 84 of the beverage brewing device 20 may be made from any suitable material, such as plastic. For instance, the body 26 and lid 84 may be made from a plastic that is free of Bisphenol A (BPA) and that is dishwasher-safe and durable. The body 26 and lid 84 may also be manufactured in any suitable manner. As a nonlimiting example, the body 26 and lid 84 may be made through plastic injection molding as a single unit with the flexible hinge 120 connecting the body 26 and lid 84.

In reference to FIGS. 1-4, the manner in which the beverage brewing device 20 may be used will now be described. Upon selecting a dry beverage medium to be brewed, such as coffee grounds, tea, etc., the beverage brewing device 20 may be set on a counter or other device such that the lid 84 may be moved into the open position. The lid 84 is moved about the axis defined by the flexible hinge 120 into the open position, and the brew chamber 36 is filled with a desired amount of dry beverage medium, such as coffee grounds G, as shown in FIG. 4. For the strongest brew, the brow chamber 36 is filled up to the fill line 142 (see FIG. 3) such that the coffee grounds G will be tamped by the dispersion cone 124 when the lid 84 is closed.

With the coffee grounds G or another dry beverage medium added to the brew chamber 36, the lid 84 may be moved into the closed position, is shown in FIG. 4. With the lid 84 in the closed position, the annular protrusion s received within the open top end 30 of the body 26, and the annular seal 116 is sealed against the interior surface of the body 26. Moreover, if the coffee grounds G have been filled up to the fill line 142, the dispersion cone 124, upon closing the lid 84, will tamp the coffee grounds G within the brew chamber 36.

With the coffee grounds G or other dry beverage medium disposed within the beverage brewing device 20, the beverage brewing device 20 may be Inserted into the beverage brewer B for brewing a beverage. In that regard, the beverage brewing device 20 is disposed within a brewing holster H of a beverage brewer B such that the first and second grips 62 and 66 are received within correspondingly shaped cavities R in the brewing holster H. With each of the first and second grips 62 and 66 received within a correspondingly shaped curved cavity R of the brewing holster H, the beverage brewing device 20 is aligned within the brewing holster H such that one of the first and second opposing outlet probe receptacles 54 and 38 in the beverage brew device 20 receives an outlet probe O of the beverage brewer B.

With the beverage brewing device 20 received within the brewing holster H, the inlet probe assembly is lowered into engagement with the beverage brewing device 20, either manually or automatically (depending on the configuration of the beverage; brewer B). The inlet probe assembly is lowered until the inlet probe shoulder S abuts against the inlet probe shoulder 104 of the receptacle plug 92 and the inlet probe I is disposed within the inlet probe opening 106 of the receptacle plug 92, as shown in FIG. 4.

With the inlet probe I in the brewing position, a beverage may be brewed according to the beverage brewer instructions. As can be appreciated by one of ordinary skill, to brew a beverage, the beverage brewer B dispenses heated water through the inlet probe I, which passes through the inlet probe opening 106 of the receptacle plug 92 and into the dispersion cone 124. The heated water, which becomes at least somewhat pressurized within the dispersion cone 124, passes through the dispersion cone openings 136 to substantially evenly and uniformly soak the coffee grounds G within the brew chamber 36. The brewed beverage passes through the coffee grounds O and out of the openings 40, 44, 48, and/or 50 in the body 26 of the beverage brewing device 20 and into a cup C or other container positioned below the brewing holster H in the beverage brewer B. After brewing a beverage, the beverage brewing device 20 can be removed from the brewing holster H and cleaned for subsequent use.

It can be appreciated from the foregoing that the beverage brewing device 20 can be used with a typical single-server beverage brewer B, such as that shown and described with reference to FIGS. 1 and 4, without retrofitting, or modifying the beverage brewer B. With the exception of the need to add a dry beverage medium to the brew chamber 36 of the beverage brewing device 20, the beverage brewing device 20 functions based on substantially the same beverage brewing extraction principles for which the single-server beverage brewer was originally made.

Figure 5:
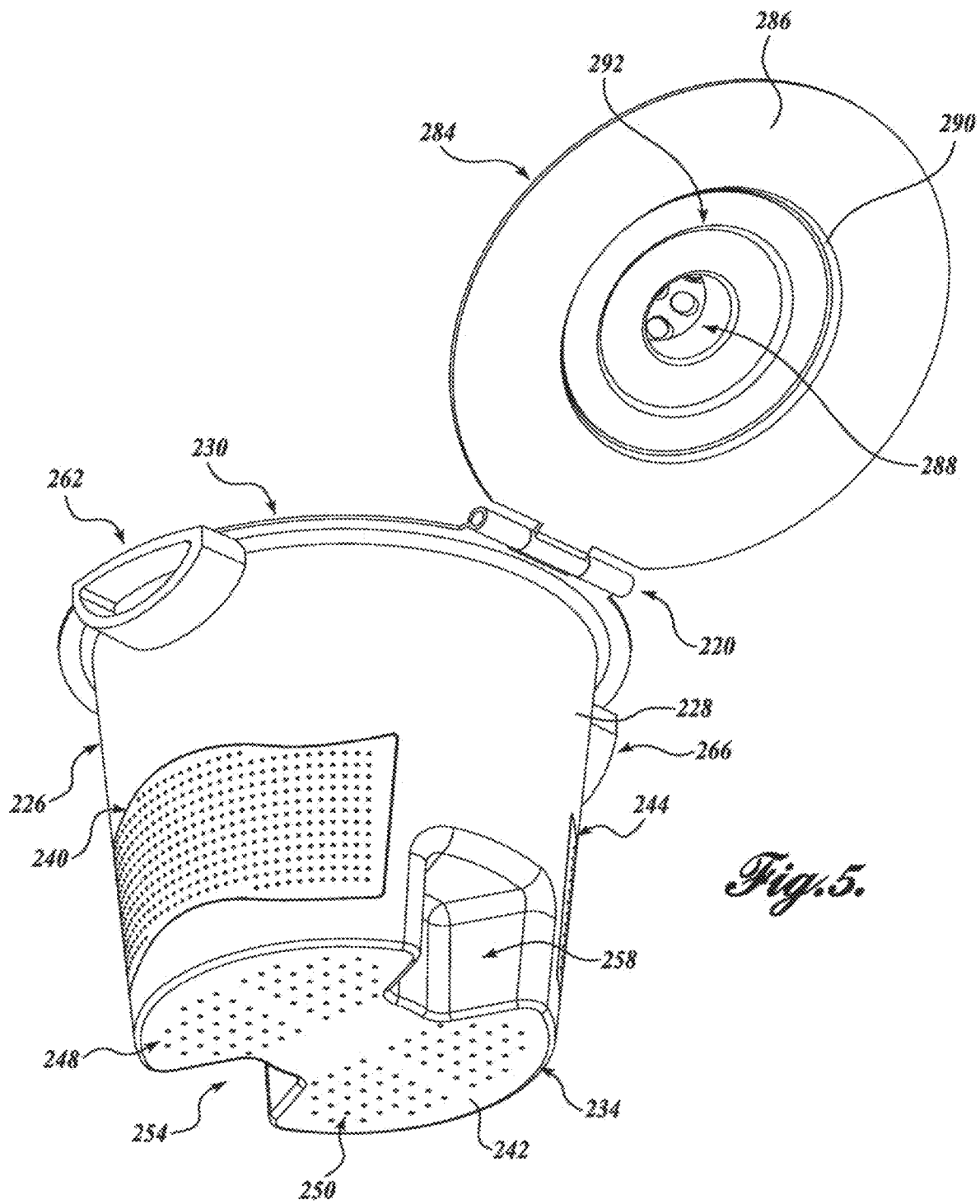
FIG. 5 is a bottom isometric view of a beverage brewing device formed in accordance with a second exemplary embodiment of the present disclosure.
Figure 6:
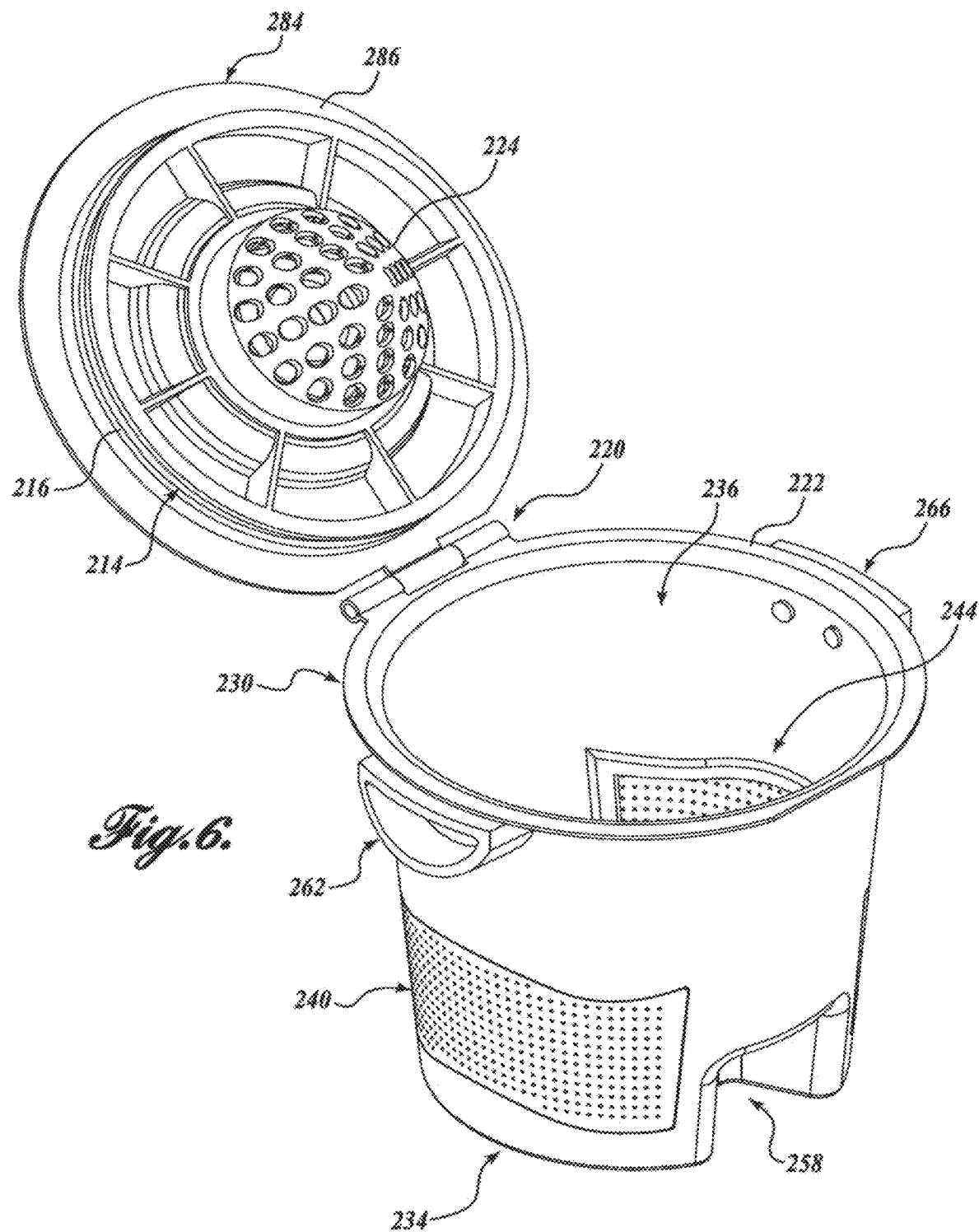
FIG. 6 is a top isometric view of the beverage brewing device of FIG. 5.
Figure 7:
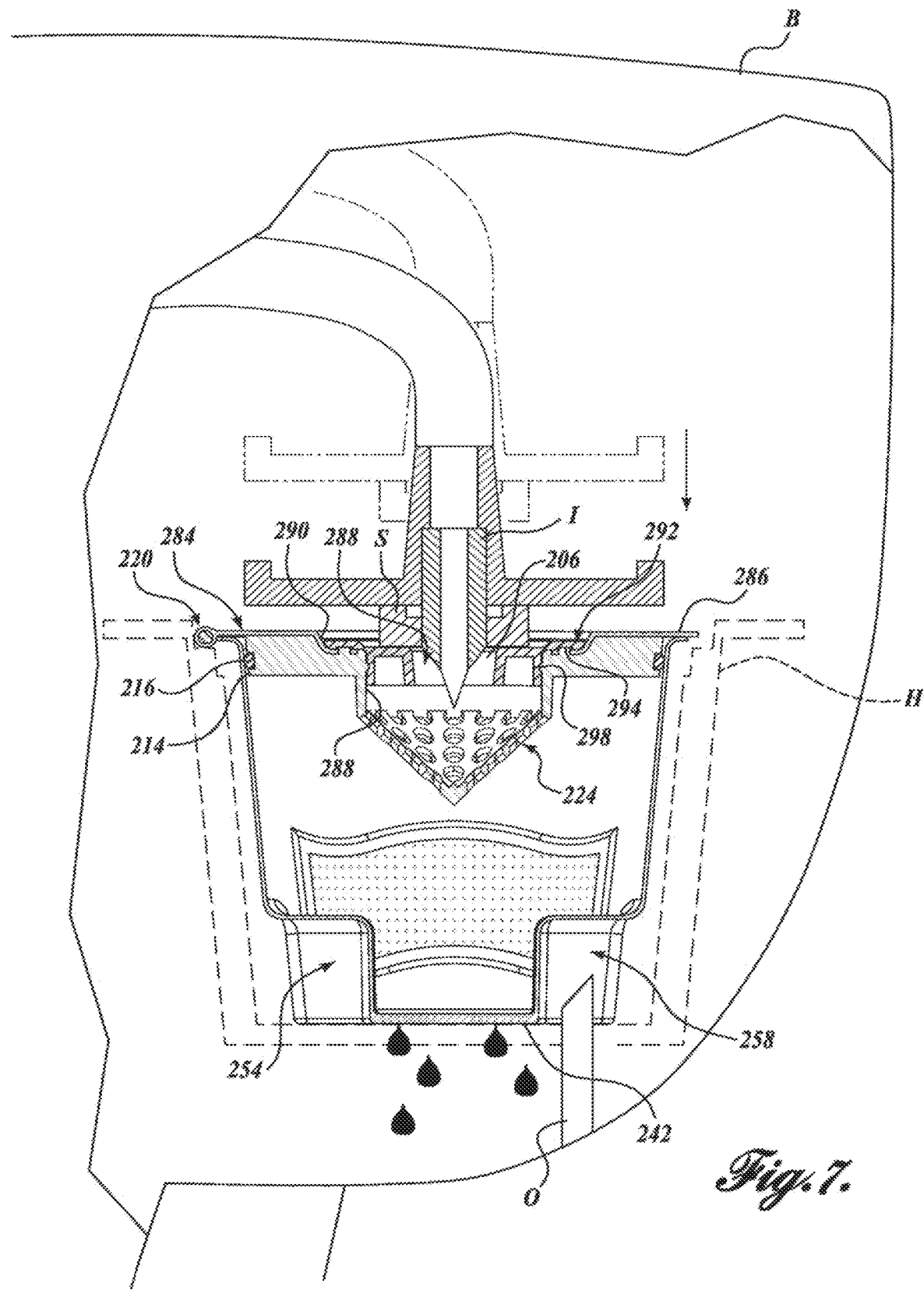
FIG. 7 is cross-sectional view of the beverage brewing device of FIG. 5 shown in use with a beverage brewer.

Referring to FIGS. 5-7, a reusable beverage brewing device 220 formed in accordance with a second exemplary embodiment of the present disclosure will now be described. The reusable beverage brewing device 220 is substantially similar to the reusable beverage brewing device 20 described above; and thus, the description will be primarily based on the differences between the first and second embodiments. In that regard, many of the same or similar features have been labeled with the same reference number, with the features for the reusable beverage brewing device 220 labeled in the 200 series.

The beverage brewing device 220 has a substantially cup-shaped, cylindrical body 226 and a lid 284 hingedly secured thereto that is moveable between open and closed positions. The body 226 and lid 284 of the beverage brewing device 220 are made from a suitable metal, such as stainless steel. Other suitable durable metals may also be used, such as aluminum, brass, etc.

The body 226 and lid 284 may be manufactured using any suitable or well-known techniques for forming, metal, including extruding, punching, welding, riveting, etc. It should be appreciated that although the beverage brewing device 220 is described as being made from a suitable metal, other materials, such as plastic, may instead be used without departing from the scope of the present disclosure.

The substantially cup-shaped, cylindrical body 226 corresponds in shape and size to the interior of the brewing holster H of the beverage brewer B. The cup-shaped body 226 has a curved, substantially vertical sidewall 228 extending between an open top end 230 and a closed bottom end 234 defined by a substantially flat bottom surface 242. The sidewall 228 and closed bottom end 234 define a brew chamber 236 within the interior of the cup-shaped body 226.

At least one filter is defined within the body 226 of the brewing device 220 for filtering water as it passes through the brew chamber 236. More specifically, first and second opening filter areas 240 and 244 are defined within the sidewall 228, and first and second opposing filter areas 248 and 250 are defined within the bottom surface 242. The filter areas may be defined by a pattern of micro perforations sized to allow a brewed beverage to pass therethrough while retaining the dry medium within the body 226. The micro perforations may be formed in any suitable manner, such as by laser cutting.

A micro perforated plate may be used to define the sidewall 228 or bottom surface 242, with the micro perforations formed within the filter areas 240, 244, 248, or 250. In the alternative, a micro perforated plate may first be formed and then integrated within the sidewall 228 or bottom Surface 242. For instance, to define the sidewall filter areas 240 and 244, micro perforated plates may be welded within openings in the first and second opposing filter areas 240 and 244.

By forming the micro perforations with a micro perforated plate that defines the sidewall 228 or bottom surface 242, or a plate that is otherwise welded within an opening, within the brewing device 220, the edges of the micro perforated plate do not form an abrupt edge within the interior of the brew chamber 36. In this manner, a smooth, substantially seamless transition is defined between the filter area 240, 244 and the body 226. As such, any dry beverage medium, such as coffee grounds, will not become lodged within crevices that would otherwise be created by any exposed or frayed edges.

The brewed beverage may flow through the micro perforations in the filter areas 240 and 244 in the sidewall 228 and through the micro perforations in the filter areas 248 and 250 in the bottom surface 242 into the brewing holster H. The brewing holster H and/or the beverage brewer B may include suitable structure (not shown) to funnel or otherwise direct the brewed beverage down into the cup C for consumption.

Before disposing the beverage brewing device 220 within the brewing holster H for brewing, the brew chamber 236 must first be filled with a desired dry beverage medium, such as coffee grounds. As noted above, the closed bottom end 234 Is defined by a substantially flat bottom surface 242. With a substantially flat bottom surface 242, the beverage brewing device 220 can be easily set onto a surface, such as a counter, and the brew chamber 236 can be filled with the desired dry beverage medium. In other words, the substantially flat bottom surface 242 allows for hands-free filling and less mess when filling the brew chamber 236 with, for instance, coffee grounds.

With the brew chamber 236 filled with, for instance, coffee grounds, the beverage brewing device 220 may be disposed within a brewing holster H of a beverage brewer B to brew a beverage. As discussed briefly above, the beverage brewing device 220 is configured for use within a brewing holster H of a beverage brewer having an outlet probe O that extends upwardly into the brewing holster compartment of the beverage brewer B. In that regard, the body 226 includes first and second opposing outlet probe receptacles 254 and 258 extending upwardly from the bottom surface 242 of the body 226 and inwardly from the sidewall 228.

Each outlet probe receptacle 254 and 258 is of a sufficient depth and width to receive the outlet probe O so that the beverage brewing device 220 may be fully received within the brewing holster H. Moreover, the interior wall of the receptacles 254 and 258 fluidly isolates the outlet probe O from the brew chamber 236 when the outlet probe O is received within one of the first and second outlet probe receptacles 254 or 258.

The first and second outlet probe receptacles 254 and 258 are defined within opposite sides of the bottom surface 242 of the body 226 such that the beverage brewer 220 may be configured in one of two positions to seat within the brewing bolster H (i.e., with one of the first and second opposing outlet probe receptacles 254 and 258 receiving the outlet probe O). It should be appreciated that the body 226 may instead include only one outlet probe receptacle such that the beverage brewer 220 is positionable in only one position within the brewing holster HL. As yet another alternative, three or more outlet probe receptacles may instead be formed within the body 226 such that the beverage brewer 220 may be configured in three or more positions within the brewing holster.

It can be appreciated that however many number of outlet probe receptacles used (e.g., one, two, three, etc.) the remaining portion of the bottom surface 242 defines a flat surface upon which the beverage brewing device 220 may rest when being filled with a dry beverage medium. In that regard, the beverage brewing device 220 may optimally include only two outlet probe receptacles 254 and 258 to ensure the bottom surface 242 is sufficiently large for resting on a surface and supporting the beverage brewing device 220 in an upright position during the fill process.

Moreover, by including no more than, for instance, two outlet probe receptacles 254 and 258, the body 226 can effectively have a deeper, larger interior brew chamber capacity. A larger brew chamber 236, as can be appreciated by one of ordinary skill in the art, can hold more dry beverage medium, such as coffee grounds, and can help create more turbulence during brewing for a more uniform, more efficient, and more thorough beverage extraction. The increased internal volume of the brew chamber 236 therefore accommodates consumers that prefer a stronger brew or more ounces of brewed coffee.

The body 226 is also formed such that its interior surface, including the surface defined by the outlet probe receptacles 254 and 258, has substantially rounded edges. As a result, the interior surface of the body 226 includes no hard-edged transitions and no crevices or corners where coffee grounds or other dry beverage mediums can get stuck. This helps ensure an easier cleanup for the consumer after the use of the beverage brewing device 220. In this manner, after each use, the beverage brewing device 220 may be quickly cleaned and reused for brewing another beverage.

To help align the beverage brewing device 220 within the brewing bolster H such that the one of the first and second opposing outlet probe receptacles 254 and 258 receives the outlet probe O, the beverage brewing device 220 may include first and second opposing grips 262 and 266 that are receivable within correspondingly shaped cavities R (only one cavity R shown in hidden lines in FIG. 1 for clarity) in the brewing holster H when the beverage brewer 220 is disposed in the brewing position.

The first and second grips 262 and 266 are also graspable by a user for helping to insert and remove the beverage brewing device 20 from within the brewing bolster H. In that regard, the first and second grips 262 and 266 may be coated with or otherwise formed with a heat-resistance, non-slip material, such as rubber. Other aspects of the first and second grips 262 and 266 are substantially similar to first and second grips 62 and 66 described above; and therefore, the first and second grips 262 and 266 will not be further described in detail.

Before positioning the body 226 within the brewing bolster H for brewing a beverage, the brewing chamber 236 is first enclosed by the removable lid 284. The lid 284 is sized and configured on an exterior side to mate with the inlet probe I of the beverage brewer B when the beverage brewing device 220 is received within a brewing holster H. (See FIG. 5). Moreover, the lid 284 is sized and configured on an interior side to seat within the top opening defined by the body 226 and distribute water received from the inlet probe I for brewing. (See FIG. 6).

The lid 284 is substantially similar to the lid 84 described above. In other words, the exterior side of the lid 84 is suitable for mating with the inlet probe I of a beverage brewer B and distributing the water from the inlet probe I into the brew chamber 36 of the beverage brewing device 220 for brewing a beverage. The lid 284 includes a lid body 286 having a substantially flat upper surface suitable to mate with a flat portion of an inlet probe assembly of the beverage brewer B (see FIG. 7). A dispersion cone opening 288 is defined in substantially the center of the lid body 286 that opens into a dispersion cone 224. The dispersion cone opening 288 is in fluid communication with a receptacle 290 formed within the lid body 286. A receptacle plug 292 is disposed within the receptacle 290 to define an inlet probe opening 206 that is in fluid communication with the dispersion cone 224. However, the lid 284 differs from lid 84 in that the elastomeric receptacle plug 292 is overmolded within the receptacle 290 rather than being removably received therein.

The receptacle plug 292 is overmolded within the receptacle 290 of the lid 284 in a manner well known in the industry. For instance, a primer of adhesive may first be applied to the surface of the lid 284 before the receptacle plug 292 is overmolded onto the lid 284. In the depicted embodiment, the lid 284 includes a plurality of mechanical protrusions 294 formed within the bottom interior surface of the receptacle 290. The mechanical protrusions 294 protrude upwardly from the bottom of the receptacle 290 to mechanical interlock with the overmolded receptacle plug 292. Similarly, an annular protrusion 298 is defined within the dispersion cone opening 288 to interlock with the overmolded receptacle plug 292.

When disposed within the receptacle 290, the receptacle plug 292 is sized and configured to scalingly engage the inlet probe I or its surrounding inlet probe assembly, similar to receptacle plug 92 described above. By overmolding the receptacle plug 292 within the receptacle 290 of the lid 284, the receptacle plug 292 may be formed from an elastomeric, scaling material. However, the receptacle plug 292 is securely formed within the metal receptacle 290 of the lid 284. Thus, overmolding provides the flexibility of using multiple materials in a one piece design. Referring to FIGS. 5 and 6, the interior side of the lid 284 suitable for enclosing the brew chamber 236 within the body 226 and for distributing water received from the inlet probe I for brewing will now be described. The interior side of the lid 284 is substantially similar to lid 84 described above. In that regard, the lid 284 includes a circular or annular protrusion 214 concentrically formed on the interior surface of the lid 284 that is sized and shaped to seat within the top opening defined by the body 226 of the beverage brewing device 220. An annular seal 216 is disposed within an annular recess extending around the annular protrusion 214 for mating with the top open end of the body 226 and forming a water-tight seal therebetween.

The lid 284 is hingedly secured to the body 226 such that the lid 284 may be moved between open and closed positions, substantially similar to lid 284 described above. Although any suitable hinge may be used, in the depicted embodiment, a piano hinge 220 is defined between the lid body 286 and a flanged rim 222 formed substantially transversely around the top open end of the body 226.

When the lid 284 is in the closed position, as shown in FIG. 7, the inlet probe I is positioned to extend through the inlet probe opening 206 in the receptacle; plug 292 to release water into the dispersion cone 224, which is configured to help distribute water released from the inlet probe L. The dispersion cone 224 is substantially identical in structure and operation to the dispersion cone 124 described above; and therefore, it will not be further described.

In reference to FIGS. 5-7, the manner in which the beverage brewing device 220 may be used will now be described. Upon selecting a dry beverage medium to be brewed, such as coffee grounds, tea, etc., the beverage brewing device 220 may be set on a counter or other device such that the lid 284 may be moved into the open position. The lid 284 is moved about the axis defined by the hinge 220 into the open position, and the brew chamber 236 is filled with a desired amount of dry beverage medium, such as coffee grounds. For the strongest brew, the brew chamber 236 may be filled up to a fill line (not shown) near the upper open end of the brew chamber 236 such that the coffee grounds will be tamped by the dispersion cone 224 when the lid 284 is closed.

With the coffee grounds or another dry beverage medium added to the brew chamber 236, the lid 284 may be moved into the closed position, as Shown in FIG. 7. With the lid 284 in the closed position, the annular protrusion 214 is received within the open top end 230 of the body 226, and the annular seal 216 is s caled against the interior surface of the body 226. Moreover, if the coffee grounds have been filled up to a fill line, the dispersion cone 224, upon closing the lid 284, will tamp the coffee grounds within the brew chamber 236.

With the coffee grounds or other dry beverage medium disposed within the beverage brewing device 220, the beverage brewing device 220 may be inserted into the beverage brewer B for brewing a beverage. In that regard, the beverage brewing device 220 is disposed within a brewing holster H of a beverage brewer B such that the first and second grips 262 and 266 are received within correspondingly shaped cavities R in the brewing holster H. With each of the first and second grips 262 and 266 received within a correspondingly shaped curved cavity R of the brewing holster H, the beverage brewing device 220 is aligned within the brewing holster H such that one of the first and second opposing outlet probe receptacles 254 and 258 in the beverage brewing device 220 receives an outlet probe O of the beverage brewer B.

With the beverage brewing device 220 received within the brewing holster H, the inlet probe assembly is lowered into engagement with the beverage brewing device 220, either manually or automatically (depending on the configuration of the beverage brewer B). The inlet probe assembly is lowered until the inlet probe abuts against the receptacle plug 292 and the inlet probe I is disposed within the inlet probe opening 206, as shown in FIG. 7.

With the inlet probe I in the brewing position, a beverage may be brewed according to the beverage brewer instructions. As can be appreciated by one of ordinary skill, to brew a beverage, the beverage brewer B dispenses heated water through the inlet probe I, which passes through the inlet probe opening 206 of the receptacle plug 292 and into the dispersion cone 224. The heated water, which becomes at least somewhat pressurized within the dispersion cone 224, passes through the openings in the dispersion cone 224 to substantially evenly and uniformly soak the coffee grounds within the brew chamber 236. The brewed beverage passes through the coffee grounds and out of the openings in filter areas 240, 244, 248, and/or 250 in the beverage brewing device 220 and into a cup C or other container positioned below the brewing holster H in the beverage brewer B.

While illustrative embodiments have been illustrated and described, it will be appreciated that various changes can be made therein without departing from the spirit and scope of the invention.

The invention claimed is:

1. A beverage brewing device comprising:
a lid hingedly attached to a body and moveable between opened and closed positions, the lid having a central opening;
the body comprising:
a sidewall having a circular upper rim for engagement with the lid in the closed position, a lower edge defining a lower perimeter, and an inner sidewall surface extending between the upper rim and the lower edge;

a bottom surface having an inner bottom surface and an outer bottom surface opposite the inner bottom surface, the bottom surface extending across the lower perimeter such that the inner bottom surface intersects the inner sidewall surface, the inner sidewall surface and inner bottom surface combining to form an internal volume;

an outlet probe receptacle having a receptacle wall positioned inwardly from the inner sidewall surface, positioned in the bottom surface inwardly from the lower edge toward a center of the bottom surface, and extending upwardly from the inner bottom surface and the lower edge, the receptacle wall configured as an indentation extending into the internal volume; and one or more filter areas defined in the body;

wherein the sidewall, the bottom surface, the receptacle wall, and the one or more filter areas are configured to, in combination, retain a dry beverage medium within the internal volume; and whereby a liquid is insertable through the central opening of the lid and will flow out of the internal volume through the one or more filter areas.

2. The beverage brewing device of claim 1, wherein the sidewall, bottom surface, and receptacle are plastic injected molded as a single unit.

* * * * *